J. B. ARCHER.
BALING MANURE AND OTHER SUBSTANCES.

No. 181,389.          Patented Aug. 22, 1876.

UNITED STATES PATENT OFFICE.

JAMES B. ARCHER, OF YONKERS, NEW YORK.

IMPROVEMENT IN BALING MANURE AND OTHER SUBSTANCES.

Specification forming part of Letters Patent No. 181,389, dated August 22, 1876; application filed July 20, 1876.

*To all whom it may concern:*

Be it known that I, JAMES B. ARCHER, of Yonkers, in the county of Westchester and State of New York, have invented a new and useful Improvement in Baling Manure and other substances; and I do hereby declare that the following is a full, clear, and exact description of the same, reference being had to the accompanying drawing, forming part of this specification.

This invention is more especially designed for the baling of stable-manure, in which it has heretofore been found difficult to meet all the requirements of properly confining the material in all parts of the bale, and yet to provide desirable ventilation. It is also applicable to the baling of hay and other substances or materials.

The improvement consists in the combination of two complete frames applied to opposite sides of the bale, and of a form and size to extend all along the edges, and to the corners of said sides, with bands which pass over the said frames and around the bale, and confine the material of bale between the said frames in such manner that the said frames form clamps to clamp said material firmly.

Figure 1:
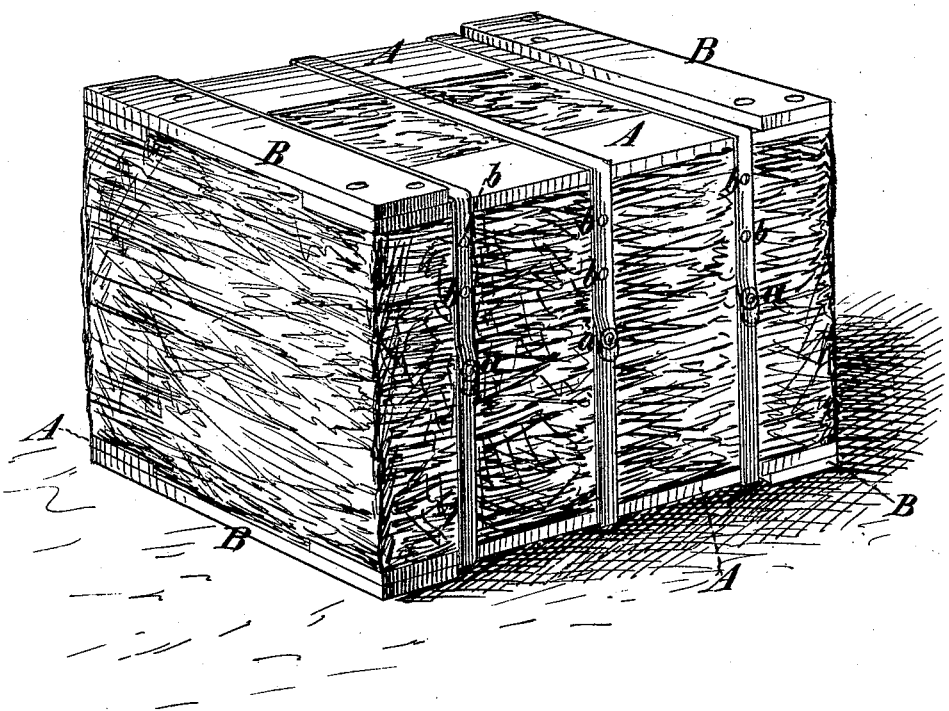
Figure 2:
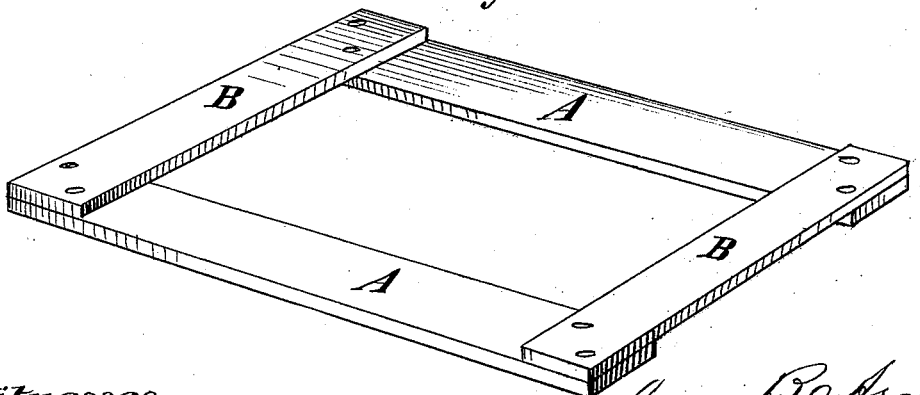

Figure 1 in the drawings is a perspective view of a bale illustrating my invention. Fig. 2 is a perspective view of one of the frames.

Similar letters of reference indicate corresponding parts in both figures.

The two frames are each composed of side pieces A A and end pieces B B, consisting of wooden slats, the said side pieces being of a length equal to the length of the bale, and the said end pieces being of a length equal to the width of the bale. These side and end pieces are nailed or otherwise secured together at the ends to form the frames, which are thus made of a size and form to cover the edges and corners of the two opposite sides of the bale to which they are applied.

The bands C C, of which there may be any number, may be of hoop-iron, wire, or other material, and may be fastened around the bale over the said frames by any suitable fastenings; but I prefer to provide them with hooks $a\ a$ and eyes $b\ b$, two or more eyes in each band, so that some time after the bale has been compressed and the material in it has shrunk by drying, it may be recompressed and the bands tightened up.

The frames A B having been made, the bale is formed in a baling-press of suitable size by first placing one of the frames on the bottom of the box of the press, then filling in upon it the requisite quantity of the material to be baled, afterward putting on the top frame, and then subjecting the contents of the bale between the frames to a suitable pressure. The bands having been applied at a suitable stage in the operation, have their ends fastened while the bale is subject to pressure, and after they have been fastened the box of the press is opened and the bale turned out.

The bale thus formed confines and protects the material most effectively; but the contents may be still further protected at the corners or other parts by placing cleats across the bale from one frame to the other, and nailing them to the two frames.

What I claim as my invention is—

The combination, with a bale, of the clamping-frames A B A B, applied to opposite sides of the bale, and the bands C C, passing over the said frames and around the bale, substantially as herein described.

J. B. ARCHER.

Witnesses:
BENJAMIN W. HOFFMAN,
FRED. HAYNES.